Jan. 2, 1968 V. S. UMANTSEV 3,361,936

PRINTED CIRCUIT BLOCK OF SERIES-CONNECTED ELECTRIC RESISTORS

Original Filed May 12, 1964

United States Patent Office 3,361,936
Patented Jan. 2, 1968

3,361,936

PRINTED CIRCUIT BLOCK OF SERIES-CONNECTED ELECTRIC RESISTORS

Victor Sergeevich Umantsev, Krasnodar, U.S.S.R., assignor to Zavod Elektroizmeriteljnykh Priborov, Krasnodar, U.S.S.R.

Continuation of application Ser. No. 366,821, May 12, 1964. This application Sept. 29, 1966, Ser. No. 583,148
2 Claims. (Cl. 317—101)

ABSTRACT OF THE DISCLOSURE

In order to provide for adjustment of resistance following manufacture, a printed block of series connected resistors is provided with an excess of resistors and with conductors bridging the said resistors and selectively destructible whereby the finally desired resistance can be obtained.

Figure 1:
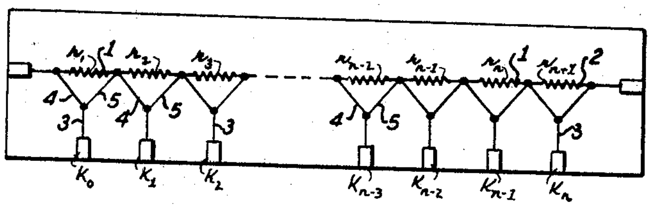

This is a continuation of application Ser. No. 366,821, filed May 12, 1964, now abandoned.

This invention relates to the fields of radio engineering and measuring instruments and more particularly to the manufacture of printed circuit blocks of electric resistors in which the entire set of resistors as well as connections between them and their taps are made in one sheet of the resistor material.

It is well known that during the manufacture of measuring instruments, for example, potentiometers, all efforts are directed towards maintaining similar temperature characteristics of resistors employed in said instruments.

At present printed circuit resistor blocks of various shapes complete with a great number of resistors, a plurality of connections between them and of taps to connect the block to an external electrical circuit by means, for example, of a multiterminal connector, are being employed for achieving this object.

However, the mass production of said blocks by means of etching or electrical erosion from a single sheet is a labor-consuming process, and does not exclude the eventuality of defective resistors being incorporated into the block in the course of the manufacturing process. It is impossible to replace the defective resistor without causing thereby the disturbance of uniformity and stability of the material in the common circuit the resistors; hence, even a single defective resistor makes the entire block faulty. The abovementioned disadvantages limit the field of application of said printed block in the mass production of measuring instruments.

Although there have been attempts to overcome these difficulties and disadvantages, no positive results were achieved. Yet I have succeeded in solving this problem and in putting it into practice.

It is now established that the manufacture of spare resistors out of the same sheet, of which the main resistors were made, and connecting the former in series with the latter, as well as the manufacture of auxiliary printed conductors connecting the taps to several points of the circuit of resistors ensures the desired result.

A principal object of this invention is to ensure the possibility of replacing defective resistors, detected after the block has been manufactured, with resistors which will not impair the uniformity of the electrical circuit material and do not require soldering, welding, or other bonding methods that might impair the temperature characteristics and the stability of the resistors comprised in a block.

The present invention also ensures employment of a high percentage of printed blocks by means of replacement of any defective resistor, irrespective of its location in a circuit consisting of a plurality of series-connected resistors of the same value of resistance.

The present invention is based upon a new configuration of the set of conductors of the block of printed resistors and upon the use of other parts of the block as will be described more fully hereinafter.

Figure 2:
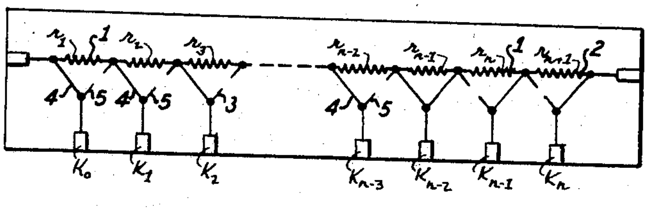
Figure 3:
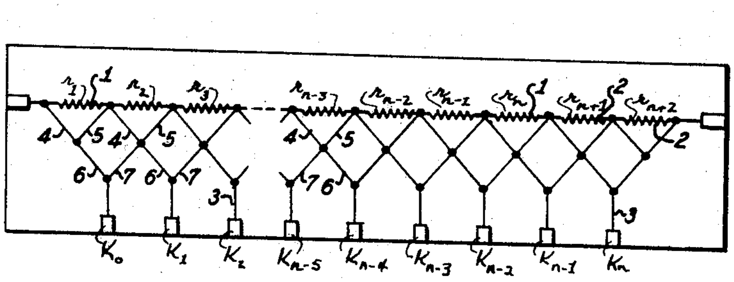
Figure 4:
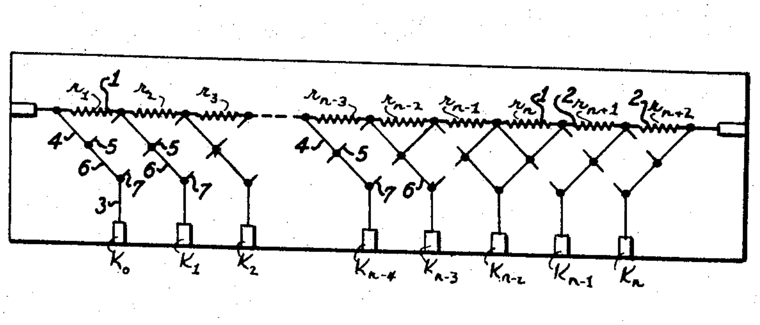

These and other advantages of the present invention will become more fully apparent from a consideration of the following description of a preferred embodiment, taken in conjunction with the accompanying drawings, in which:

FIGS. 1 and 3 show schematic diagrams of the manufactured printed circuit blocks, and FIGS. 2 and 4 show the same blocks but with replaced defective resistors.

The blocks which, after being manufactured, have to contain "*n*" good resistors, comprise main resistors 1 (from $r_1$ to $r_n$) and auxiliary resistors 2 ($r_{n+1}$ and $r_{n+2}$), which are made of the same sheet and series-connected to main resistors 1. To connect the block to the external electric circuit, printed taps 3 (from $K_0$ to $K_n$) are provided. The taps are made complete with the resistors and printed conductors 4, 5, 6 and 7 short-circuiting all the resistors of the block.

FIG. 2 illustrates the schematic diagram of a block which permits replacement of a single defective resistor in accordance with FIG. 1. In case one of the resistors 1, for example $r_{n+1}$, was found defective during the manufacturing process, it can be replaced by an auxiliary (spare) resistor 2 by means of cutting the printed conductors 5 of all the resistors 1 located to the left of the defective resistors and cutting conductors 4 of all the resistors 1 located to the right of the defective resistor. When this occurs, the defective resistor remains short-circuited.

FIG. 4 illustrates the schematic diagram of a block which permits the replacement of both of a single and pair of defective resistors in accordance with FIG. 3.

In case a couple of resistors, for example $r_{n-2}$ and $r_n$, are found to be defective, they may be replaced by two auxiliary resistors 2 ($r_{n+1}$ and $r_{n+2}$).

The replacement is effected by cutting the printed conductors 5 and 7 of all the resistors 1 located to the left of the left-hand defective resistor, and by cutting the printed conductors 4 and 6 of all the resistors 1 and 2 located to the right of the right-hand defective resistor; and by means of cutting the printed conductors 4 and 7 of all the resistors 1 which are located between the defective resistors, as is illustrated in the drawing; alternatively, by means of cutting the printed conductors 5 and 6 (not shown in the drawing). When this occurs, the defective resistors remain short-circuited.

The printed blocks which permit replacement of several defective resistors might be manufactured in a similar manner.

It should be noted that the printed block of resistors of the present invention permits rapid replacement of a single or several defective resistors without impairing the uniformity and stability of the block material.

The invention also ensures the possibility of connecting the printed block to the external electric circuit by means of a connector having a fixed position of terminals irrespective of the location of the replaced defective resistors.

Although the present invention is described in accordance with a preferred embodiment of its realization, it is understood that when putting this invention into practice certain alterations and modifications might take place without departing from the concept and scope of the invention which will be readily understood by those skilled in the art. These alterations and modifications are considered as falling within the scope of the invention, as defined in the appended claims.

I claim:

1. An article of manufacture comprising a printed block of series-connected electrical resistors, a plurality of terminals for connecting resistors of said block to an external electrical circuit, said series-connected electrical resistors being in a quantity of at least one resistor more than the quantity of resistors required for connecting them between said terminals, a row of bridgings which short-circuit respective of said electrical resistors, said bridgings including sections coupled at a junction connected to said terminals, the sections being of a length suitable for severing, all said terminals, resistors and bridgings being constituted of one sheet of resistance determining material whereby there is insured without impairing uniformity and stability thereof the possibility of connection between said terminals of all required resistors with the required connections between them by severing said bridgings to leave ineffective any one of said resistors which may be defective.

2. An article of manufacture comprising a printed block of series-connected electrical resistors, a plurality of terminals for connecting resistors of the said block to an external electrical circuit, said series-connected electrical resistors being in a quantity of at least two excess resistors more than the quantity of resistors required for connection between said terminals, a first row of bridgings short-circuiting each of said electrical resistors, at least one further row of bridgings in pyramid relationship with the first said row, the total quantity of rows being equal to the quantity of excess resistors, each of the bridgings of each of said further rows short-circuiting each two adjacent bridgings included in each foregoing row in the pyramid relationship and connecting to them at junctions dividing each bridging of said foregoing row into two parts each of which has a length adapted for being severed, the bridgings of the last of said rows being connected to said terminals at junctions dividing each bridging into two parts each having a length adapted for being severed, all said terminals, resistors, and bridgings being constituted of one sheet of resistance determining material whereby there is insured without impairing uniformity and stability thereof the possibility of connection between said terminals of all required resistors with required connections between them by severing said bridgings, leaving ineffective a plurality of resistors in a quantity equal to said excess resistors.

References Cited

UNITED STATES PATENTS

| | | | |
|---|---|---|---|
| 2,758,256 | 8/1956 | Eisler | 317—101 |
| 2,985,709 | 5/1961 | Mammola | 174—68.5 |
| 3,033,914 | 5/1962 | Acosta-Lleras | 174—68.5 |

ROBERT K. SCHAEFER, *Primary Examiner.*

J. R. SCOTT, *Assistant Examiner.*